US011211669B2

United States Patent
Shao et al.

(10) Patent No.: US 11,211,669 B2
(45) Date of Patent: Dec. 28, 2021

(54) BATTERY BACKUP UNIT (BBU) SHELF WITH A FIRE EXTINGUISHING SYSTEM

(71) Applicant: Baidu USA LLC, Sunnyvale, CA (US)

(72) Inventors: Shuai Shao, Milpitas, CA (US); Tianyi Gao, San Jose, CA (US); Huawei Yang, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 139 days.

(21) Appl. No.: 16/785,456

(22) Filed: Feb. 7, 2020

(65) Prior Publication Data

US 2021/0249639 A1  Aug. 12, 2021

(51) Int. Cl.
*H01M 50/383* (2021.01)
*H01M 10/42* (2006.01)
*H01M 50/30* (2021.01)

(52) U.S. Cl.
CPC ....... *H01M 50/383* (2021.01); *H01M 10/425* (2013.01); *H01M 50/394* (2021.01); *H01M 2010/4271* (2013.01)

(58) Field of Classification Search
CPC ....... H01M 10/425; H01M 2010/4271; H01M 50/383; H01M 50/394
USPC ........................................................ 429/82
See application file for complete search history.

(56) References Cited

U.S. PATENT DOCUMENTS

| 9,891,685 | B1 * | 2/2018 | Marr | ........................... G06F 1/30 |
| 10,153,937 | B1 * | 12/2018 | Marr | .................. H04L 41/0659 |
| 2012/0247713 | A1 * | 10/2012 | Radermacher | ........ H01M 10/63 165/41 |

FOREIGN PATENT DOCUMENTS

CA            2727200 A1 *  7/2011  ............. A62C 37/04

\* cited by examiner

*Primary Examiner* — James M Erwin
(74) *Attorney, Agent, or Firm* — Womble Bond Dickinson (US) LLP (57) ABSTRACT

According to one embodiment, a battery backup unit (BBU) shelf includes a controller, a supply line to supply a fire extinguishing agent, one or more BBUs, each BBU having a battery module and a temperature sensor. The shelf further includes a flow meter that is coupled to the supply line and measures a flow rate of the fire extinguishing agent flowing through the supply line and produces a flow rate signal that represents the flow rate. For each of the BBUs, the shelf includes a spray nozzle to spray the fire extinguishing agent onto the BBU and a valve that is coupled between the supply line and the spray nozzle. The controller is configured to 1) receive temperature signals from the temperature sensors and 2), for each BBU that has a temperature that exceeds a temperature threshold, open the valve of the BBU to spray the fire extinguishing agent.

20 Claims, 5 Drawing Sheets

BATTERY BACKUP UNIT (BBU) SHELF WITH A FIRE EXTINGUISHING SYSTEM

FIELD

Embodiments of the present disclosure relate generally to a battery backup unit (BBU) shelf for electronic racks with a fire extinguishing system.

BACKGROUND

Lithium-ion batteries are commonly used in the vehicle industry, for example, electric vehicles (EVs) and plug-in hybrids. Lithium-ion battery packs for electric vehicles are designed for vehicle specific requirements and usage. Lithium-ion batteries, however, are also becoming more popular for Information Technology (IT) equipment stored and operated in data centers as an energy storage unit that is replacing Uninterruptible Power Supply (UPS) systems.

Large clusters of computer servers can be kept in dedicated facilities, often in a rack enclosure. The servers can be used in support of the data center industry. Use of a battery backup unit (BBU) in place of traditional solutions, such as lead-acid based UPS systems has grown in popularity. One result of the BBU's new role in the data center space is the relocation of the BBU from a centralized battery room to a data center IT room. The thermal environment (temperature) in the data center is generally managed and operated based on specifications and requirements of the servers, not batteries and therefore may not be optimized for BBU use.

Thermal management of (e.g., lithium-ion) batteries of a BBU in a data center application is a major concern. For example, if battery cell temperature exceeds a certain threshold (e.g., 70° C.) during operation (e.g., charging and/or discharging) there may be a thermal runaway, which may lead to battery failure. For instance, if the temperature exceeds the threshold, exothermic chemical reactions within the battery cell may escalate heat generation, further increasing the battery cell temperature, which may result in battery failure in a short time period. Several causes can lead to thermal runaway including hotspot thermal expansion in the battery cell, degradation, short circuit and individual discrepancies between battery cells. In addition, these causes may exist either when the batteries are charging/discharging or not. Due to the excessive heat, a battery failure may result in a fire, which may damage any surrounding BBUs and IT equipment. Therefore, a fire suppression system is needed.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The present disclosure solves the problem of thermal runaway of battery cells in a battery backup unit (BBU) employed in a data center. The solution proposed in the current disclosure provides a fire extinguishing (or fire suppression) system for a forced air-cooled BBU shelf that utilizes inert gas to extinguish a fire. Specifically, the present disclosure describes a BBU shelf that may house one or more BBUs that are air-cooled using fans that may be coupled to the shelf. In addition, the shelf includes a fire extinguishing system that has a spray nozzle for each BBU in the shelf and a supply line that couples the spray nozzles to an external agent source (e.g., one or more tanks) that stores a pressurized fire extinguishing agent, such as an inert gas. The system also includes a valve that is coupled between each spray nozzle and the supply line. To determine whether to release the inert gas, the system measures the temperature of each of the BBUs and determines whether the temperature exceeds a temperature threshold (e.g., 100° C.). In response to detecting an excess temperature in a BBU, the valve of the spray nozzle associated with the BBU is opened to release the inert gas onto the BBU. The presence of the inert gas reduces the concentration of oxygen that is present within the BBU shelf, thereby extinguishing the fire. In addition, the present disclosure describes controlling the valves of the fire extinguishing system to optimize the flow rate of the inert gas in order to extinguish the fire within a minimum (or predefined) period of time.

According to one embodiment, a BBU shelf includes a controller, a supply line to supply a fire extinguishing agent from an external source, one or more BBUs, each BBU having a battery module with one or more battery cells and a temperature sensor to sense an internal temperature of the BBU and to produce a temperature signal that represents the temperature. For each of the one or more BBUs, the shelf includes a spray nozzle to spray the fire extinguishing agent onto the BBU and a valve that is coupled between the supply line and the spray nozzle. The controller is configured to 1)

receive the temperature signal from the temperature sensor of each BBU and 2), for each BBU that has a temperature that exceeds a temperature threshold, open the valve of the BBU, thereby allowing the spray nozzle of the BBU to spray the fire extinguishing agent.

In one embodiment, the fire extinguishing agent is a pressurized inert gas. In another embodiment, the BBU shelf further includes one or more fans that are coupled to the BBU shelf, the fans to push ambient air or draw the ambient air into the BBU shelf. In some embodiments, when at least one valve is open, the one or more fans are deactivated to prevent the fans from pushing or drawing the ambient air.

In one embodiment, the BBU shelf further includes a flow meter that is coupled to the supply line and measures a flow rate of the fire extinguishing agent flowing through the supply line and produces a flow rate signal that represents the flow rate. In some embodiments, the controller is configured to determine an optimal flow rate at which the fire extinguishing agent is to flow based on a number of BBUs that have a temperature exceeding the temperature threshold and one or more predefined parameters, and, for each of the BBUs that has a temperature exceeding the temperature threshold, set an opening ratio of the valve of the BBU based on a difference between the flow rate and the optimal flow rate. In another embodiment, the one or more predefined parameters comprise an internal volume of the BBU shelf and a predefined period of time for which the open valves are to remain open.

In one embodiment, a power source that is external to the BBU shelf provides power to each valve and the controller, each valve is a fail-open valve that opens in response to the power source ceasing to provide the power to at least one of 1) the valves and 2) the controller. In another embodiment, the controller is configured to close each of the open valves after a predefined period of time.

According to one embodiment, a method for controlling one or more valves of a BBU shelf that includes one or more BBUs, each BBU having a battery module with one or more battery cells. The method includes receiving an indication that one or more BBUs have begun to either discharge battery energy stored in battery cells of the BBUs to a load or draw power from an external power supply to charge the battery cells, obtaining, from a temperature sensor of each of the BBUs, a temperature signal that represents a temperature of the BBU, determining whether the temperature of any of the one or more BBUs exceeds a temperature threshold, and releasing a fire extinguishing agent only onto the BBUs that have a temperature exceeding the temperature threshold.

In one embodiment, the fire extinguishing agent is a pressurized inert gas. In another embodiment, the method further includes, in response to receiving the indication, activating one or more fans to air cool the one or more BBUs by either pushing ambient air or drawing the ambient air into the BBU shelf. In some embodiments the method further includes, in response to determining that any of the one or more BBUs exceeds the temperature threshold, deactivating the one or more fans to prevent the fans from pushing or drawing the ambient air.

In one embodiment, the BBU shelf includes a supply line to supply the fire extinguishing agent from an external source, and, for each of the one or more BBUs, a spray nozzle and a valve that is coupled between the supply line and the spray nozzle. Releasing the fire extinguishing agent includes, for each of the BBUs that has a temperature exceeding the temperature threshold, opening a respective valve to cause a respective spray nozzle to spray the fire extinguishing agent onto the BBU. In another embodiment, the method further includes obtaining, from a flow meter that is coupled to the supply line, a flow rate signal that represents a flow rate of the fire extinguishing agent flowing through the supply line. In some embodiments, the method further includes determining an optimal flow rate at which the fire extinguishing agent is to flow based on a number of BBUs that have a temperature exceeding the temperature threshold and one or more predefined parameters, and, for each of the BBUs that has a temperature exceeding the temperature threshold, setting an opening ratio of the respective valve based on a difference between the flow rate and the optimal flow rate. In another embodiment, the one or more predefined parameters comprise an internal volume of the BBU shelf and a predefined period of time for which the open valves are to remain open.

In one embodiment, each of the valves is a fail-open valve that opens in response to a power failure of the BBU shelf. In another embodiment, method further includes closing each of the open valves after a predefined period of time.

According to one embodiment, an electronic rack includes several pieces of Information Technology (IT) equipment, at least one of the pieces of IT equipment including one or more servers to provide data processing services, a power supply unit coupled to the pieces of IT equipment, and a BBU shelf to provide backup power to the pieces of IT equipment when the power supply is unavailable. The BBU shelf including a controller, one or more BBUs, a spray nozzle and a valve for each BBU as previously described.

It should be mentioned that the phrase "battery pack" may be used herein interchangeably with "BBU", "BBU module" and with "BBU pack". Also, a BBU may include one or more battery modules (or battery packs). A battery module may include one or more battery cells. Other features are also described in the following examples.

Figure 1:
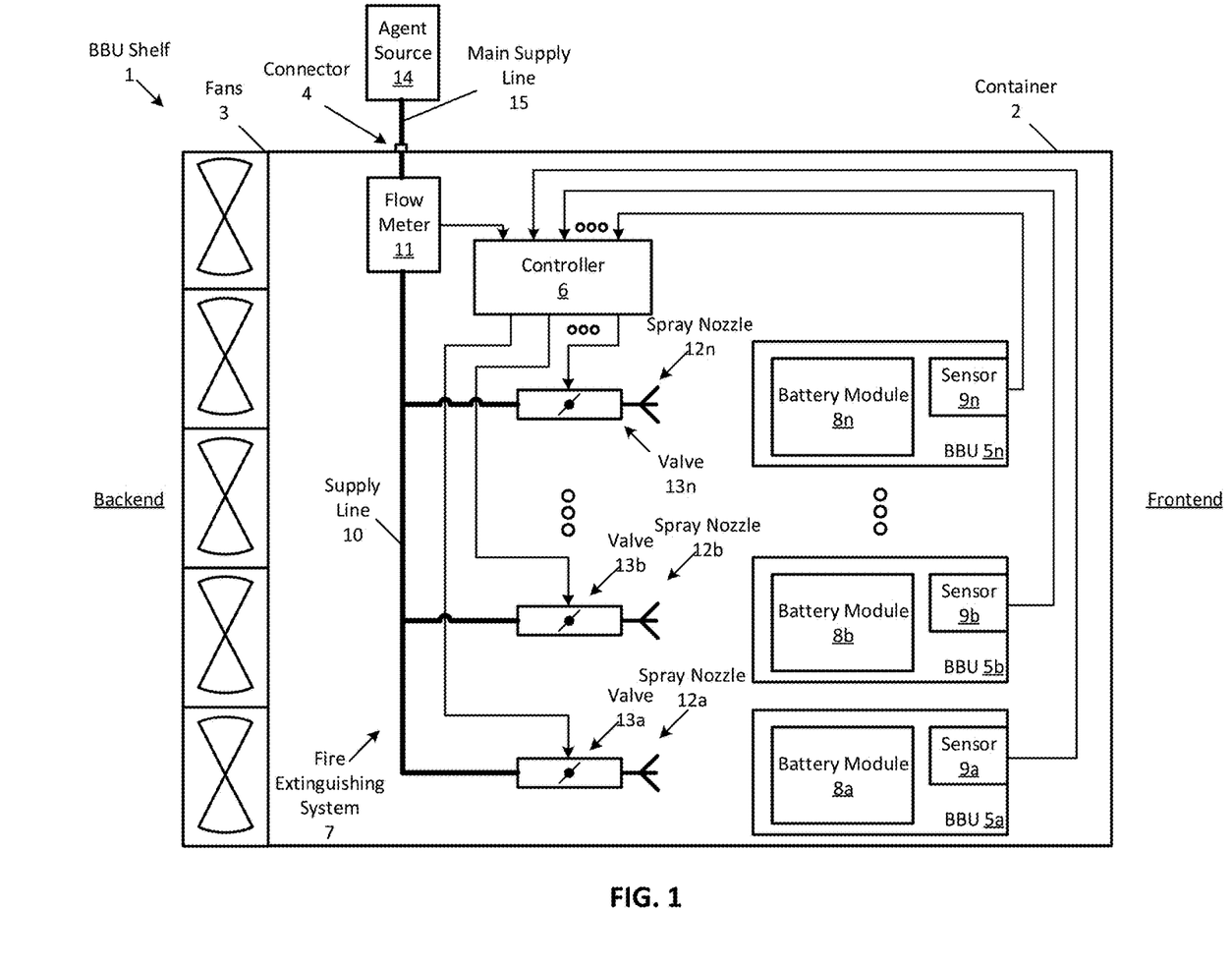
FIG. 1 is a block diagram illustrating an example of a battery backup unit (BBU) shelf with a fire extinguishing system according to one embodiment.

FIG. 1 is a block diagram illustrating an example of a battery backup unit (BBU) shelf with a fire extinguishing system according to one embodiment. Specifically, this figure shows a BBU shelf 1 that includes a container 2 and one or more fans 3 that are coupled (mounted) to a backend of the container. In one embodiment, the fans may be coupled to the frontend of the container, or both ends. The fans are for pushing ambient air (e.g., air from within a data center room) into the container and out the frontend, or drawing the ambient air into the frontend and out of the backend. In one embodiment, the container may include one or more vents (or openings) that fluidly connect the ambient environment to the inside of the container in order to allow air to pass into or out of the container.

The container 2 includes one or more BBUs 5a-5n, a controller 6, a connector 4, and a fire extinguishing system 7. The fire extinguishing system includes a flow meter 11, a supply line 10, one or more spray nozzles 12a-12n, and one or more valves 13a-13n. In one embodiment, the BBU shelf may include more or less elements. For example, the container may include several controllers. As another example, the container may not include a connector.

This figure also illustrates an agent source 14 that is separate from (or external to) the BBU shelf 1. In one embodiment, the source may be mounted within an electronic rack in which the BBU shelf is mounted. In another embodiment, the agent source is for storing a fire extinguishing agent. Specifically, the source may be one or more gas cylinders or tanks that store the agent in a pressurized state (e.g., above atmospheric pressure). In one embodiment, the agent may be a pressurized gas that does not undergo chemical reactions when exposed to extreme heat. For example, the gas may be a pressurized inert gas, such as Nitrogen ($N_2$) or Carbon Dioxide ($CO_2$).

Also illustrated, the agent source 14 that is coupled to the (container 2 of the) BBU shelf 1 via a main supply line 15 that is coupled between the source and connector 4, which may be a dripless blind mating quick disconnect. In one embodiment, the connector may be any type of connector that enables a technician to couple the main supply line 15 to the connector. In one embodiment, the connector is able to removeably couple to the main supply line 15.

Each of the BBUs includes a battery module 8 and a temperature sensor 9 (e.g., BBU 5a includes module 8a and sensor 9a). Each of the battery modules may include one or more battery cells that are series-connected, parallel-connected, or a combination thereof. The battery cells may be of any type, such as Lithium-ion. As described herein, each of the BBUs are for providing battery energy stored within their cells to a load (e.g., a piece of IT equipment) with which the BBUs are electrically coupled (e.g., via electronic connectors). In addition, the BBUs may be electrically coupled to a power supply (or source) to charge the battery cells therein. Each of the temperature sensors $9a$-$9n$ are for sensing (or measuring) a temperature of a respective BBU. Specifically, each of the sensors may sense an internal temperature of the BBU. In one embodiment, the temperature sensor may be an internal temperature sensor that is integrated within the BBU, or the temperature sensor may be an external temperature sensor that is disposed on the BBU. When disposed on the BBU, the sensor senses the (external) surface temperature of the BBU. Each of the sensors also produce a temperature signal that represents the sensed temperature. As described herein, each of the sensors transmit the produced temperature signal to the controller 6 of the BBU (e.g., via a wired or wireless connection). In one embodiment, when over a wireless connection, the sensor or wireless transmitter (not shown) of the BBU may communicate with the controller 6 via any wireless protocol (e.g., BLUETOOTH protocol).

As illustrated, each of the BBUs is a rectangular box. In one embodiment, the BBUs may have any shape, such as being cube-shaped or cylindrically-shaped. In another embodiment, the BBUs may include one or more battery modules and/or one or more temperature sensors. For instance, at least one of the BBUs may include an internal temperature sensor and an external temperature sensor in order to provide a more accurate temperature reading.

The fire extinguishing system 7 includes a supply line 10, at least one flow meter 11, one or more valves $13a$-$13n$, and one or more spray nozzles $12a$-$12n$. The supply line 10 is coupled to the main supply line 15 via the connector 4. In one embodiment, the supply line 10 connects directly to the main supply line 15. The supply line 10 (and the main supply line 15) are for supplying the fire extinguishing agent (e.g., inert gas) from the agent source to (at least some of) the spray nozzles $12a$-$12n$. In one embodiment, the supply line 10 (and main supply line 15) may be composed of any material, such as copper, a polymer (e.g., an EPDM rubber), and/or plastic. In another embodiment, the lines may be composed of a flexible material, such as rubber.

The flow meter 11 is an electronic device that is coupled to the supply line 10 (e.g., between two sections of the supply line 10), and is for measuring a real-time gas volumetric flow rate, q, of the fire extinguishing agent as it flows through the supply line from the agent source 14 (via the main supply line 15). The meter also produces a flow rate signal that represents the flow rate and transmits the signal to the controller 6 (via a wired or wireless connection).

The spray nozzles $12a$-$12n$ are coupled to the supply line 10 and are for spraying the (pressurized) fire extinguishing agent. Specifically, as illustrated, for each BBU $5a$-$5n$ (mounted or housed) within the BBU shelf 1, there is a corresponding spray nozzle. Thus, each of the spray nozzles is for spraying the agent onto a corresponding BBU. As an example, spray nozzle 12 is for spraying the agent onto (or within close proximity) to BBU $5a$. In one embodiment, the system 7 may have one or more spray nozzles for each of the BBUs. In another embodiment, the BBU shelf has one or more slots that are each for housing a different BBU. Each BBU may be removeably housed within a slot, such that BBUs may be added and removed from (a corresponding slot of) the BBU shelf. In this case, there may be at least one corresponding spray nozzle for each slot.

Each of the valves $13a$-$13n$ is coupled between the supply line 10 and a respective spray nozzle. For instance, valve $13a$ is coupled between the supply line 10 and the spray nozzle $12a$. The valves are for controlling the release of fire extinguishing agent by their respective spray nozzles. Each BBU (and/or slot of the BBU shelf) has a spray nozzle and a corresponding valve that controls the release of the agent. Thus, when a valve is open, a respective spray nozzle releases the agent and when the valve is closed the agent is not released. Specifically, each of the valves is a mechanical valve, which opens and closes to adjust the flow of fire extinguishing agent and includes an actuator that has electronics (e.g., a processor, etc.) that receives electronic signals (e.g., control signals) to change the setting or opening ratio of the mechanical valve. In particular, each of the valves is communicatively coupled (via a wired or wireless connection) to the controller 6, which as described here, is configured to control an opening ratio of the valve based on temperature readings. As a result, the controller may transmit the control signals, which causes the actuator to adjust the opening ratio, as described herein.

Other configurations of the fire extinguishing system are possible. For example, rather than having one valve for each spray nozzle, the system may include one or more valves for each nozzle. In another example, the system may include one valve for multiple nozzles. In this case, when a valve is opened, multiple spray nozzles may release the fire extinguishing agent. In some embodiments, the BBU shelf 1 may have multiple fire extinguishing systems. As a result, there may be two or more spray nozzles (and corresponding valves) for each BBU (or slot) of the BBU shelf.

The controller 6 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory.

In one embodiment, the controller 6 is configured to obtain temperature signals from the temperature sensors $9a$-$9n$ of each of the BBUs $5a$-$5n$, where each temperature signal represents the temperature of a respective BBU. The controller is also configured to, for each BBU that has a temperature that exceeds a temperature threshold, open the valve of the BBU, thereby allowing the spray nozzle of the BBU to spray the fire extinguishing agent. For example, the controller determines whether a temperature of BBU $5a$ exceeds the temperature threshold. If so, the controller transmits a control signal to (electronics of) valve $13a$ to open the valve in order to allow spray nozzle 12a to spray agent upon BBU 5a. In one embodiment, the controller is configured to close the opened valves when the temperatures of the BBUs are below the temperature threshold. In another embodiment, the controller is configured to close each of the open valves after a predetermined period of time (e.g., five seconds). In some embodiments, the controller 6 is configured to adjust an opening ratio of one or more valves based on one or more predefined parameters in order to optimize the flow rate of the agent flowing through the fire extinguishing system 7. More about the operations of the controller is described herein.

In one embodiment, the fire extinguishing system 7 and/or the controller 6 may draw power from a power source that is external or separate from the BBU shelf 1 (e.g., the mains AC or a battery pack that is mounted within an electronic rack). Specifically, these components, such as the flow meter 11, the valves 13a-13n, and controller 6, may be powered by a source other than the BBUs 5a-5n that are mounted within the shelf. This is to ensure the operation of these components during instances in which at least some of the BBUs within the shelf may not be operational (e.g., during a fire). In one embodiment, at least some of the valves 13a-13n of the fire extinguishing system may be "fail-open" valves in which the valves are fully opened, thereby allowing fire extinguishing agent to be released, when power is not supplied. Specifically, the valves may open in response to the power source ceasing to provide power to at least one of the (e.g., valves of the) fire extinguishing system and the controller 6. For example, valves may include one or more actuator springs that open the valves when the actuator of the valve is not powered. In addition, the valves may open when they stop receiving control signals (e.g., after a period of time) due to the controller losing power or when they receive an alert signal from the controller indicating the loss of power.

Figure 2:
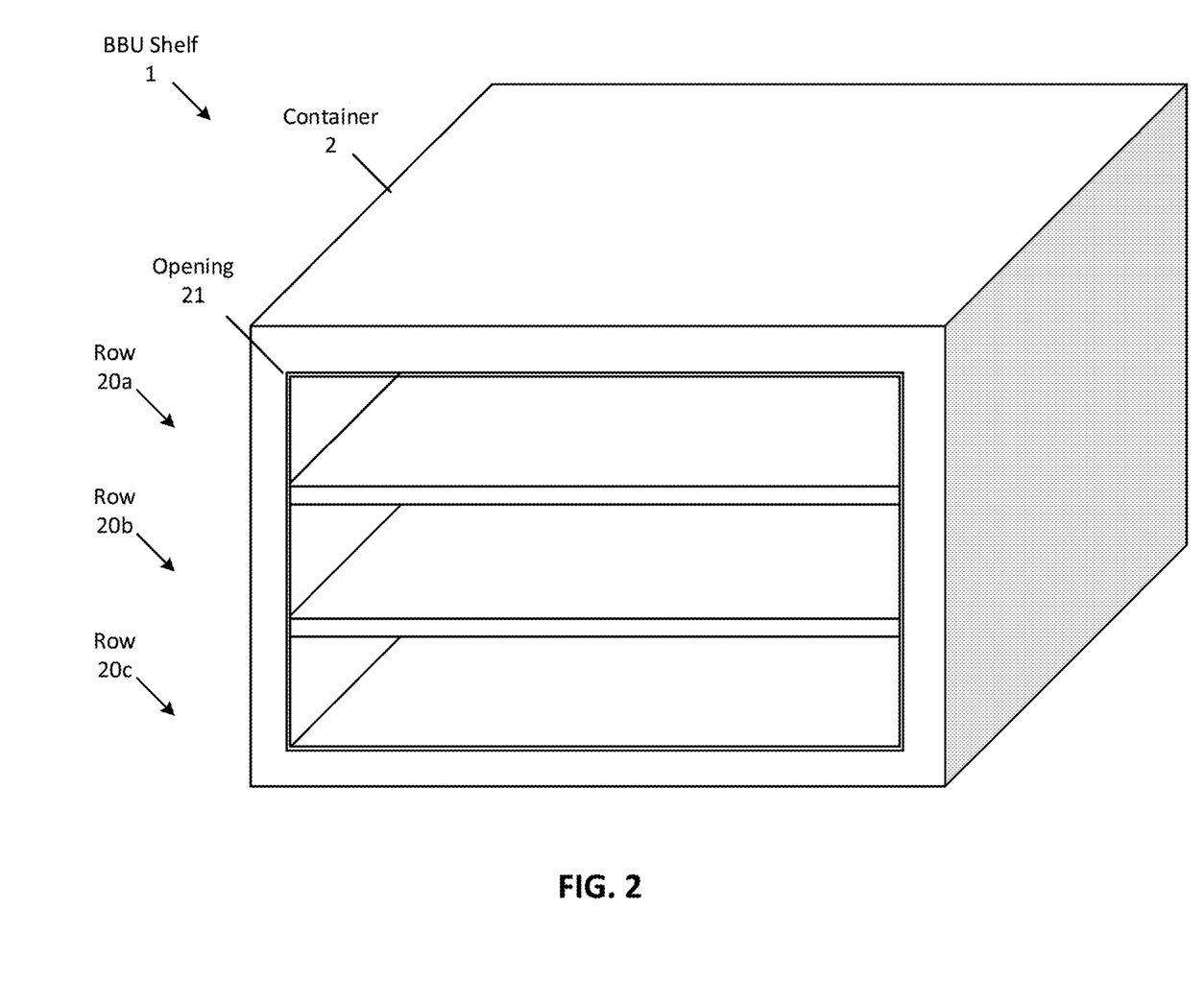
FIG. 2 is a perspective view of a BBU shelf according to one embodiment.

FIG. 2 is a perspective view of a BBU shelf according to one embodiment. Specifically, this figure shows the frontend of the BBU shelf in the perspective view. As illustrated, the container 2 (of the BBU shelf 1) is a rectangular box. In one embodiment, the container may have any shape, such as being cube-shaped or cylindrically-shaped. In one embodiment, the container may be composed of any type of material, such as a metal or an allow (e.g., steel). In another embodiment, the container may be composed of a composite material. For example, the container may include at least two layers: an inside layer that is composed of a fire-retardant material (e.g., cement, fiberglass, etc.) and an outside layer that is composed of a metal or alloy.

The container 2 includes three rows 20a-20c, each of which may hold one or more BBUs 5a-5n. In one embodiment, the BBU shelf may include more or less rows. In another embodiment, the rows may be partitioned (e.g., into slots), such that at least some BBUs that are housed in the BBU shelf are separate from other BBUs. In one embodiment, each row may include at least one spray nozzle 12 (and valve 13) for fire extinguishing purposes. Also illustrated is an opening 21, through which forced air is either pushed through or pulled into in order to cool BBUs within the container. In one embodiment, the backend (not shown in this perspective) may include a same or similar opening.

Figure 3:
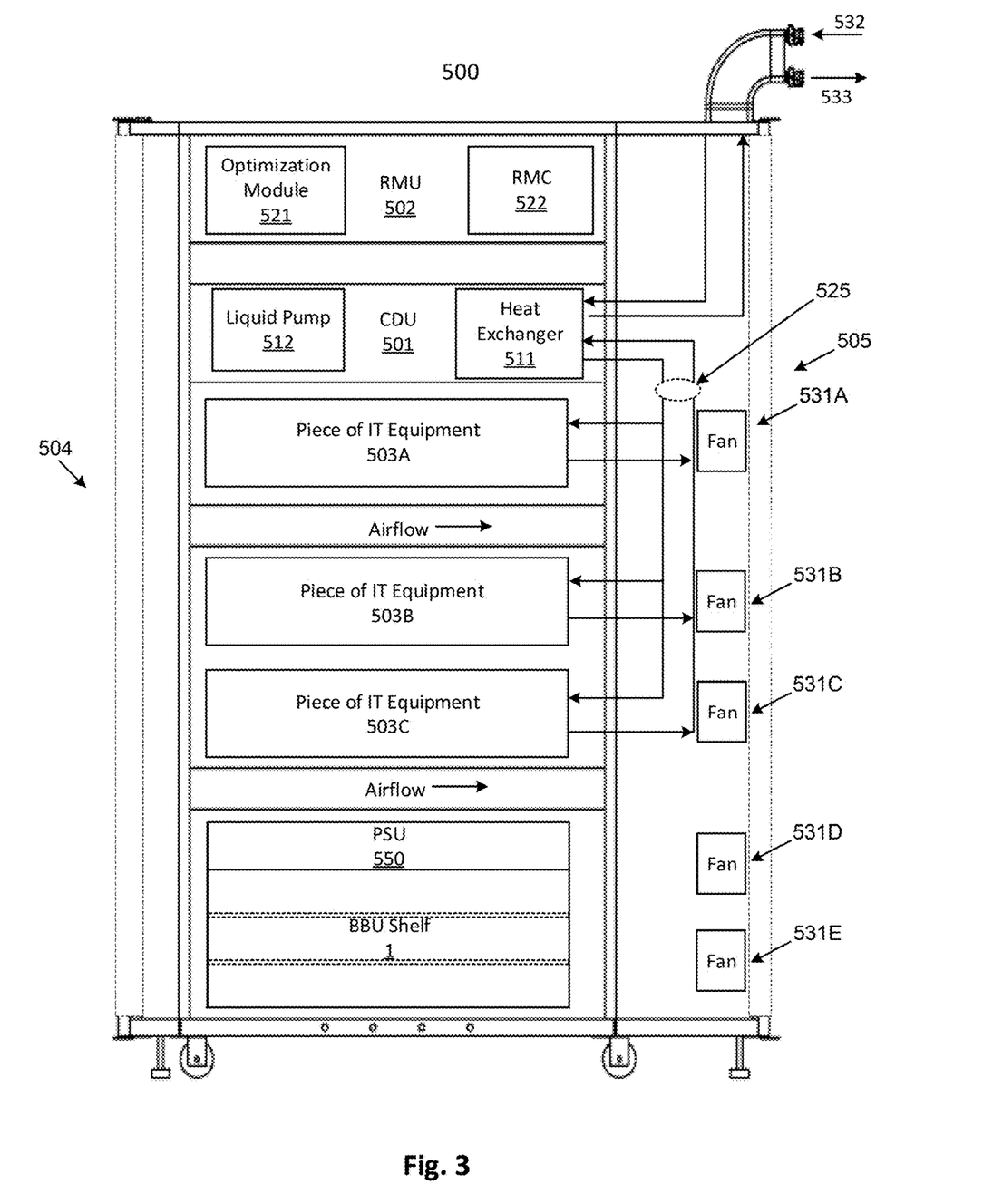
FIG. 3 is an example of an electronic rack with a BBU shelf according to one embodiment.

FIG. 3 is a block diagram illustrating an example of an electronic rack with the BBU shelf 1 according to one embodiment. Electronic rack 500 may include one or more server slots to contain one or more servers respectively. Each server includes one or more information technology (IT) components (e.g., processors, memory, storage devices, network interfaces). According to one embodiment, electronic rack 500 includes, but is not limited to, CDU 501, rack management unit (RMU) 502 (optional), a power supply unit (PSU) 550, the BBU shelf 1, and one or more pieces of IT equipment (or IT equipment) 503A-503D, which may be any type of IT equipment, such as server blades. The IT equipment 503 can be inserted into an array of server slots respectively from frontend 504 or backend 505 of electronic rack 500. The PSU 550 and/or BBU shelf 1 may be inserted into any of server slots within the electronic rack 500. In one embodiment, the BBU shelf 1 may be inserted into any of the server slots within the electronic rack 500. In another embodiment, the BBU shelf 1 may be inserted into several slots (e.g., taking up two or more slots within the rack). As illustrated, the BBU shelf 1 is inserted at the bottom (below the PSU 550) of the rack. In one embodiment, the BBU shelf 1 is located in one or more of the bottom most slots to separate the BBU shelf from pieces of IT equipment in case of fire. In one embodiment, along with or in lieu of a BBU shelf, the rack may house one or more BBUs (e.g., BBUs 5a-5n).

Note that although there are only four pieces of IT equipment 503A-503D shown here, more or fewer pieces of IT equipment may be maintained within electronic rack 500. Also note that the particular positions of CDU 501, RMU 502, PSU 550, BBU shelf 1, and IT equipment 503 are shown for the purpose of illustration only; other arrangements or configurations of these components. may also be implemented. Note that electronic rack 500 can be either open to the environment or partially contained by a rack container, as long as the cooling fans can generate airflows from the frontend to the backend (or generate airflows from the backend to the frontend).

In addition, a fan module can be associated with each of the pieces of IT equipment 503, and the BBU shelf 1. In this embodiment, fan modules 531A-531E, collectively referred to as fan modules 531, and are associated with the pieces of IT equipment 503A-503D and BBU shelf 1, respectively. Each of the fan modules 531 includes one or more cooling fans. For instance, fan module 531E may include the one or more fans 3 as illustrated in FIG. 1. Fan modules 531 may be mounted on the backends of IT equipment 503 and/or BBU shelf 1 to generate airflows flowing from frontend 504, traveling through the rack 500, and existing at backend 505 of electronic rack 900. In another embodiment, one or more of the fan modules may be positioned on the frontend 504 of the rack 500. Such frontend fans may be configured to push air into the pieces of IT equipment 503 and/or the BBU shelf 1.

In one embodiment, CDU 501 mainly includes heat exchanger 511, liquid pump 512, and a pump controller (not shown), and some other components such as a liquid reservoir, a power supply, monitoring sensors and so on. Heat exchanger 511 may be a liquid-to-liquid heat exchanger. Heat exchanger 511 includes a first loop with inlet and outlet ports having a first pair of liquid connectors coupled to external liquid supply/return lines 532-533 to form a primary loop. The connectors coupled to the external liquid supply/return lines 532-533 may be disposed or mounted on backend 505 of electronic rack 500. The liquid supply/return lines 532-533 are coupled to a set of room manifolds, which are coupled to an external heat removal system, or external cooling loop. In addition, heat exchanger 511 further includes a second loop with two ports having a second pair of liquid connectors coupled to liquid manifold 525 to form a secondary loop, which may include a supply manifold to supply cooling liquid to the pieces of IT equipment 503 and a return manifold to return warmer liquid back to CDU 501.

Note that CDUs 501 can be any kind of CDUs commercially available or customized ones. Thus, the details of CDUs 501 will not be described herein.

Each of the pieces of IT equipment 503 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. IT equipment 503 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

In one embodiment, the BBU shelf 1 is configured to provide backup power (e.g., drawing battery energy from one or more BBUs contained therein) to the rack (e.g., one or more pieces of IT equipment 503) when the rack is not drawing power from a main power source, such as during a black out. In one embodiment, operations performed by the controller 6 of the BBU shelf 1 may be performed by any of the components (e.g., IT equipment 503A) within the rack 500. For example, the IT equipment 503A may include a controller that is communicatively coupled with the flow meter 11, the temperature sensors 9a-9n, and/or the valves 13a-13n. This controller, which is external to the BBU shelf 1, may obtain signals from the temperature sensors and determine whether the fire extinguishing system should be activated based on whether any of the BBUs' temperatures exceed a threshold. Once determined, the controller may transmit control signals to one or more valves to release fire extinguishing agent onto the BBUs that have a temperature exceeding the threshold. In addition, the controller may receive a signal from the flow meter 11, and determine an opening ratio for the valves in order to optimize flow rate of the fire extinguishing agent. More about these operations are described herein.

In one embodiment, the main supply line 15 that couples the BBU shelf 1 to the agent source 14 may be a part of the electronic rack 500. Specifically, each electronic rack 500 may include a separate main supply line that is for supplying fire extinguishing agent from one or more sources to one or more BBU shelfs within the rack.

Electronic rack 500 further includes optional RMU 502 configured to provide and manage power supplied to servers 503, fan modules 531, and CDU 501. Optimization module 521 and RMC 522 can communicate with a controller in some of the applications. RMU 502 may be coupled to PSU 550 to manage the power consumption of the PSU. The PSU 550 may include the necessary circuitry (e.g., an alternating current (AC) to direct current (DC) or DC to DC power converter, backup battery, transformer, or regulator, etc.,) to provide power to the rest of the components of electronic rack 500.

In one embodiment, RMU 502 includes optimization module 521 and rack management controller (RMC) 522. RMC 522 may include a monitor to monitor operating status of various components within electronic rack 500, such as, for example, the pieces of IT equipment 503, CDU 501, and fan modules 531. Specifically, the monitor receives operating data from various sensors representing the operating environments of electronic rack 500. For example, the monitor may receive operating data representing temperatures of the processors, cooling liquid, and airflows, which may be captured and collected via various temperature sensors. The monitor may also receive data representing the fan power and pump power generated by the fan modules 531 and liquid pump 512, which may be proportional to their respective speeds. These operating data are referred to as real-time operating data. Note that the monitor may be implemented as a separate module within RMU 502.

Based on the operating data, optimization module 521 performs an optimization using a predetermined optimization function or optimization model to derive a set of optimal fan speeds for fan modules 531 and an optimal pump speed for liquid pump 512, such that the total power consumption of liquid pump 512 and fan modules 531 reaches minimum, while the operating data associated with liquid pump 512 and cooling fans of fan modules 531 are within their respective designed specifications. Once the optimal pump speed and optimal fan speeds have been determined, RMC 522 configures liquid pump 512 and cooling fans of fan modules 531 based on the optimal pump speed and fan speeds.

As an example, based on the optimal pump speed, RMC 522 communicates with a pump controller of CDU 501 to control the speed of liquid pump 512, which in turn controls a liquid flow rate of cooling liquid supplied to the liquid manifold 525 to be distributed to at least some of server blades 503. Therefore, the operating condition and the corresponding cooling device performance are adjusted. Similarly, based on the optimal fan speeds, RMC 522 communicates with each of the fan modules 531 to control the speed of each cooling fan of the fan modules 531, which in turn control the airflow rates of the fan modules 531. Note that each of fan modules 531 may be individually controlled with its specific optimal fan speed, and different fan modules and/or different cooling fans within the same fan module may have different optimal fan speeds.

Note that some or all of the IT equipment 503 (e.g., 503A, 503B, 503C, and/or 503D) may utilize different cooling methods. For instance, one server may utilize air cooling while another server may utilize liquid cooling. Alternatively, one IT component of a server may utilize air cooling while another IT component of the same server may utilize liquid cooling.

Figure 4:
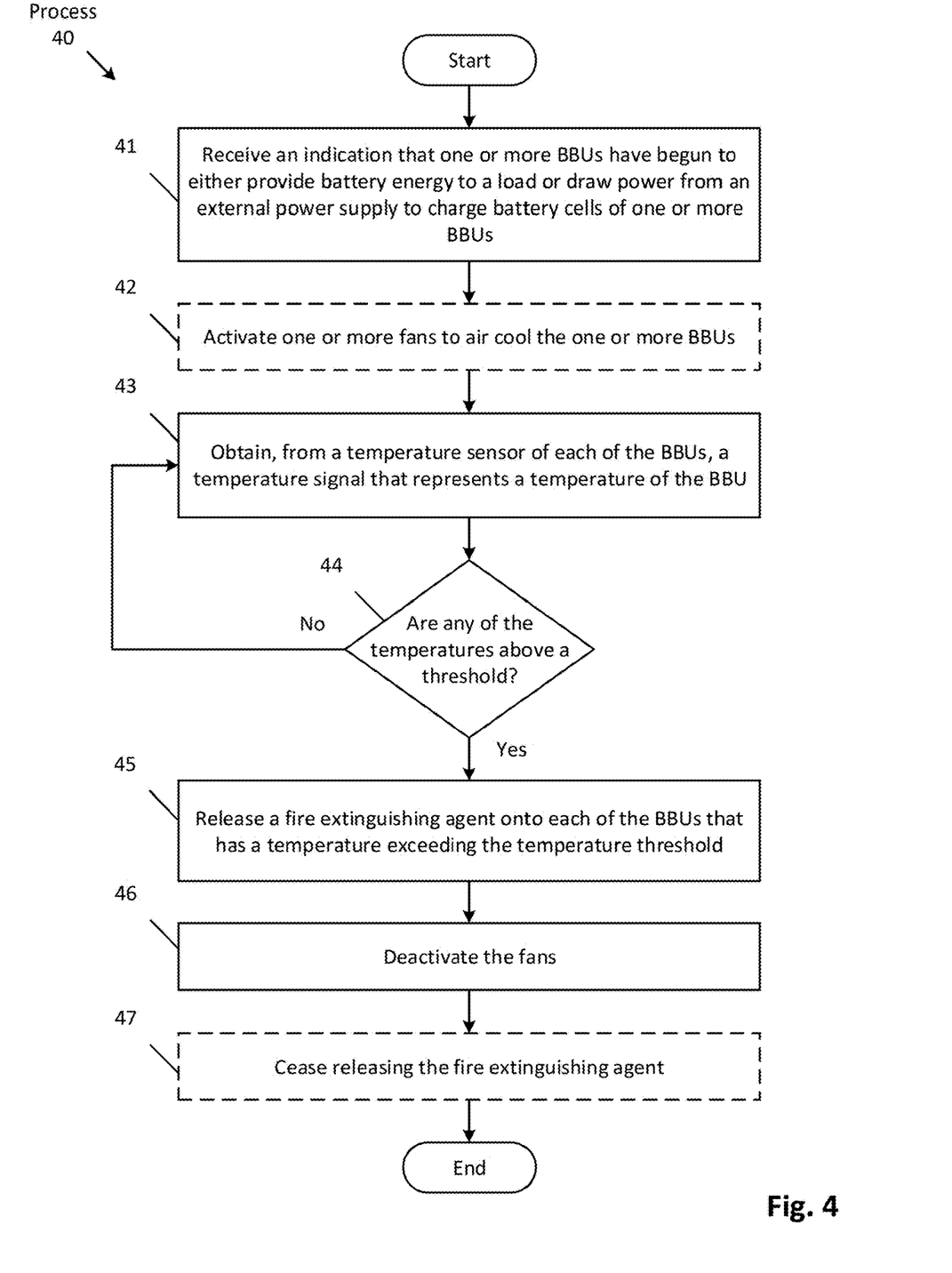
FIG. 4 is a flowchart of one embodiment of a process of activating a fire extinguishing system of a BBU shelf.

FIG. 4 is a flowchart of one embodiment of a process 40 of activating a fire extinguishing system of a BBU shelf. Specifically, the process 40 may be performed by (e.g., one or more algorithms executing on) the controller 6 of the BBU shelf 1 (or a controller external to the BBU shelf), as described herein. This process will be described with reference to FIGS. 1-3. The process 40 begins by receiving an indication that one or more BBUs (e.g., BBUs 5a-5n) have begun to either provide battery energy to a load (e.g., one or more pieces of IT equipment) or draw power from an external power supply (e.g., PSU 550) to charge battery cells of the one or more BBUs (at block 41). For instance, the controller may detect that current has begun to be discharged from the BBUs (e.g., via a current sensor). As another example, the controller may receive an indication from PSU 550 that the rack is no longer receiving power from mains AC (e.g., due to a power outage). The process 40 activates one or more fans (e.g., fans 3) to air cool the one or more BBUs of the BBU shelf (at block 42). In one embodiment, this step may be optional, since the fans may already be actively pushing or pulling ambient air from before the indication is received. The process 40 obtains, from a temperature sensor of each of the BBUs, a temperature signal that represents a temperature of the BBU (at block 43). Specifically, the controller 6 receives a temperature signal from each of the temperature sensors 9a-9n. The process 40 determines whether there are any temperatures that are above a temperature threshold (at decision block 44). At this step the controller 6 compares the temperature of each BBU to a predetermined temperature threshold, such as 100° C. If none of the temperatures exceed the temperature threshold, the process 40 returns to step 43 to continue monitoring the temperatures of the BBUs.

If, however, at least one temperature exceeds the temperature threshold the process 40 releases a fire extinguishing agent onto each of the BBUs that has a temperature exceeding the threshold (at block 45). For example, if the temperature signals from sensor 9a and 9b indicate that the temperature of their respective BBUs are above the threshold, it may be presumed that a fire is present. The controller 6 is configured to transmit control signals to valves 13a and 13b, which cause the valves to open in order to allow fire extinguishing agent within the supply line 10 to flow through the vales and out of spray nozzles 12a and 12b. The process 40 deactivates the fans of the BBU shelf (at block 46). In one embodiment, the fans are deactivated in order to stop supplying oxygen from the ambient environment to a (presumed) fire while the fire extinguishing agent is being sprayed onto the BBUs that have the excess temperature. Thus, when the valves are open, the fans are deactivated.

The process 40 ceases releasing the fire extinguishing agent (at block 47). Specifically, the controller 6 may transmit control signals to the open valves to close the valves based on certain conditions. For example, the controller may close the valves after a period of time (e.g., five seconds). As another example, the controller may continue to monitor temperatures within the BBU, and when the temperatures of each of the BBUs is below a (second) threshold, the controller may close the open valves. In one embodiment, the second temperature threshold to close the valves may be the same or different than the (first) temperature threshold that is used to open the valves. For example, the second temperature threshold may be less than the first temperature threshold.

Figure 5:
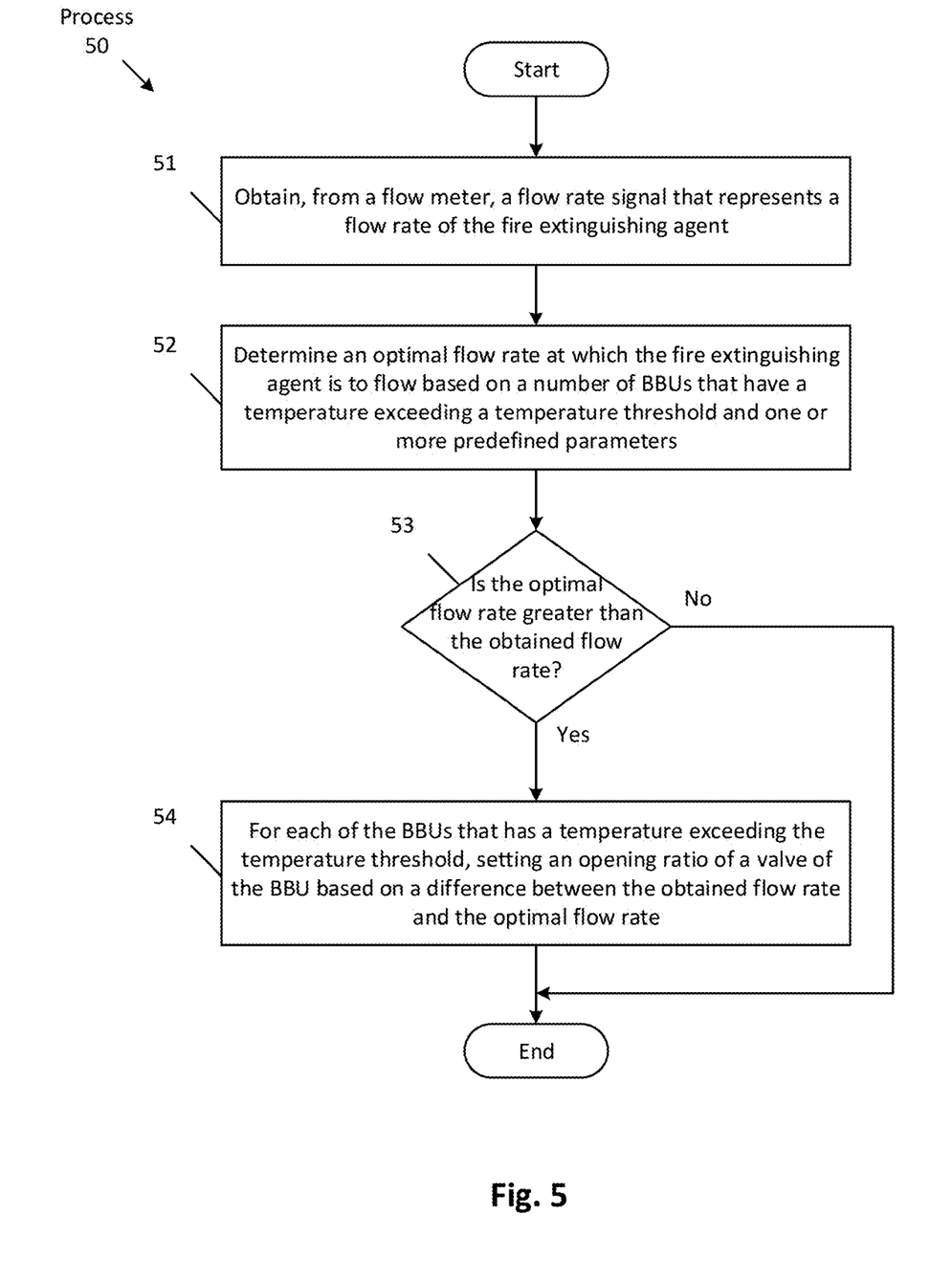
FIG. 5 is a flowchart of one embodiment of a process of setting opening ratios of one or more valves of the fire extinguishing system.

In one embodiment, when multiple BBUs in the BBU shelf 1 have temperatures that exceeds the (first) temperature threshold, the controller 6 is configured to control each of the BBUs' respective valves to cause their spray nozzles to release the fire extinguishing agent. In one embodiment, with more temperature signals (or alert signals) that are sent to the controller from more temperature sensors, which may be the result of a spreading fire, the controller may be configured to increase the flow rate of the agent that is released by the spray nozzles. FIG. 5 illustrates a process of the controller to configure the flow rate of the agent according to some embodiments. Specifically, this figure is a flowchart of one embodiment of a process 50 of setting opening ratios of one or more valves of the fire extinguishing system. The process 50 may be performed by (e.g., one or more algorithms executing on) the controller 6 of the BBU shelf 1 (or a controller external to the BBU shelf), as described herein. Specifically, the process 50 may be performed while the fire extinguishing agent is being released, such as at block 45 in process 40 of FIG. 4.

The process 50 obtains a flow rate signal that represents a flow rate of the fire extinguishing agent (at block 51). In particular, the controller 6 may obtain the signal from the flow meter 11, where the signal represents the flow rate of the agent through the supply line 10. The process 50 determines an optimal flow rate at which the fire extinguishing agent is to flow based on a number of BBUs that have a temperature exceeding the temperature threshold and one or more predefined parameters (at block 52). Specifically, to suppress the fire within a minimal time, the volumetric flow rate of the agent should be above a certain threshold. The threshold, $q_{th}$, may be obtained as follows, $$q_{th} = \frac{m \times V_{BBU}}{T_{critical}}$$

where m is the number of BBUs that have a temperature exceeding the first temperature threshold, $V_{BBU}$ is the volume of each of the BBUs mounted within the BBU shelf 1, and $T_{critical}$ is the amount of time that the fire extinguishing system 7 is to extinguish the fire (or the amount of time that the agent is to be released), such as five seconds. In one embodiment, $V_{BBU}$ and $T_{critical}$ are stored within the memory of the controller 6 and are predefined (e.g., defined by a user or by a manufacturer). In another embodiment, these values may be dependent upon the hardware configuration of the BBUs and/or the BBU shelf.

In some embodiments, $V_{BBU}$ may be the volume of the BBU shelf 1. For example, the volume may be the total internal volume of the BBU shelf (e.g., without any mounted BBUs therein). As another example, the volume may be less than the total internal volume of the shelf. Specifically, the volume may be the internal volume of the BBU shelf that takes into account the mounted BBUs therein. In other words, the volume is the total internal volume minus the combined volume of the BBUs mounted therein.

The process 50 determines if the optimal flow rate is greater than the obtained flow rate from the flow meter (at decision block 53). Specifically, the controller 6 determines whether the flow rate of the agent flowing through the system 7 should be increased in order to match (or exceed) the optimal flow rate. If so, the process 50, for each of the BBUs that has a temperature exceeding the temperature threshold, sets an opening ratio of a valve of the BBU based on a difference between the obtained flow rate and the optimal flow rate (at block 54). Specifically, the controller will adjust the opening ratio of the open valves (e.g., increasing the opening ratio) in order to allow more agent to flow through and out of the valve's spray nozzle. In one embodiment, each of the valves are adjusted the same. In another embodiment, some valves are adjusted differently. For instance, BBUs with a higher temperature may be adjusted more (or first) than BBUs with a lower temperature. In some embodiments, the controller is configured to contemporaneously obtain a flow rate signal from the flow meter, while the controller releases the agent (and/or adjusts the opening ratios of the valves). The controller is configured to adjust the opening ratio until the flow rate indicated by the flow rate signal meets or exceeds the determined optimal flow rate.

In one embodiment, if the flow rate is greater than (or equal to) the optimal flow rate (at decision block 53), the controller may release the agent for at least $T_{critical}$, after which the controller may close each of the open valves.

In one embodiment, the controller 6 may adjust the flow rate, while the number of BBUs with the temperature exceeding the temperature threshold diminishes. Specifically, the process 50 may be performed until m=0. For instance, once a BBU's temperature is determined to be less than the temperature threshold, the controller is configured to close that BBUs respective valve. The controller may recalculate the optimal flow rate based on the lesser number of BBUs that have the excess temperatures. Once m=0, the controller 6 is configured to cease releasing the agent entirely.

Some embodiments may perform variations to the processes described herein. For example, the specific operations of at least some of the processes may not be performed in the exact order shown and described. The specific operations may not be performed in one continuous series of operations and different specific operations may be performed in different embodiments. For example, operational blocks illustrated in FIG. 4 may be optional, such that they may or may not be omitted by the process 40.

As described thus far, the fire extinguishing system 7 is a part of a BBU shelf 1 that includes one or more BBUs 5*a*-5*n*. In one embodiment, however, a BBU that includes a battery module may include a fire extinguishing system. In this case, the system may be contained within (a container of) the BBU, and may be configured to release fire extinguishing agent in response to the battery module of the BBU exceeding a temperature threshold.

As previously explained, an embodiment of the disclosure may be (or include) a non-transitory machine-readable medium (such as microelectronic memory) having stored thereon instructions, which program one or more data processing components (generically referred to here as a "processor") to perform control operations, such as adjusting the opening ratio of one or more valves, as described herein. In other embodiments, some of these operations might be performed by specific hardware components that contain hardwired logic. Those operations might alternatively be performed by any combination of programmed data processing components and fixed hardwired circuit components.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

While certain aspects have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A battery backup unit (BBU) shelf, comprising:
    a controller;
    a supply line to supply a fire extinguishing agent from an external source;
    one or more BBUs, each BBU having a battery module with one or more battery cells and a temperature sensor to sense an internal temperature of the BBU and to produce a temperature signal that represents the temperature;
    for each of the one or more BBUs
        a spray nozzle to spray the fire extinguishing agent onto the BBU; and
        a valve that is coupled between the supply line and the spray nozzle,
    wherein the controller is configured to 1) receive the temperature signal from the temperature sensor of each BBU and 2), for each BBU that has a temperature that exceeds a temperature threshold, open the valve of the BBU, thereby allowing the spray nozzle of the BBU to spray the fire extinguishing agent.

2. The BBU shelf of claim 1, wherein the fire extinguishing agent is a pressurized inert gas.

3. The BBU shelf of claim 1, further comprising one or more fans that are coupled to the BBU shelf, the fans to push ambient air or draw the ambient air into the BBU shelf.

4. The BBU shelf of claim 3, wherein, when at least one valve is open, the one or more fans are deactivated to prevent the fans from pushing or drawing the ambient air.

5. The BBU shelf of claim 1, further comprising a flow meter that is coupled to the supply line and measures a flow rate of the fire extinguishing agent flowing through the supply line and produces a flow rate signal that represents the flow rate.

6. The BBU shelf of claim 5, wherein the controller is configured to
    determine an optimal flow rate at which the fire extinguishing agent is to flow based on a number of BBUs that have a temperature exceeding the temperature threshold and one or more predefined parameters, and
    for each of the BBUs that has a temperature exceeding the temperature threshold, set an opening ratio of the valve of the BBU based on a difference between the flow rate and the optimal flow rate.

7. The BBU shelf of claim 6, wherein the one or more predefined parameters comprise a volume of each of the BBUs and a predefined period of time for which the open valves are to remain open.

8. The BBU shelf of claim 1, wherein a power source that is external to the BBU shelf provides power to each valve and the controller, wherein each valve is a fail-open valve that opens in response to the power source ceasing to provide the power to at least one of 1) the valves and 2) the controller.

9. The BBU shelf of claim 1, wherein the controller is configured to close each of the open valves after a predefined period of time.

10. A method for controlling one or more valves of a battery backup unit (BBU) shelf that includes one or more BBUs, each BBU having a battery module with one or more battery cells, the method comprising:

receiving an indication that one or more BBUs have begun to either discharge battery energy stored in battery cells of the BBUs to a load or draw power from an external power supply to charge the battery cells;

obtaining, from a temperature sensor of each of the BBUs, a temperature signal that represents a temperature of the BBU;

determining whether the temperature of any of the one or more BBUs exceeds a temperature threshold; and releasing a fire extinguishing agent only onto the BBUs that have a temperature exceeding the temperature threshold.

11. The method of claim 10, wherein the fire extinguishing agent is a pressurized inert gas.

12. The method of claim 10 further comprising, in response to receiving the indication, activating one or more fans to air cool the one or more BBUs by either pushing ambient air or drawing the ambient air into the BBU shelf.

13. The method of claim 12 further comprising, in response to determining that the temperature of any of the one or more BBUs exceeds the temperature threshold, deactivating the one or more fans to prevent the fans from pushing or drawing the ambient air.

14. The method of claim 10,
wherein the BBU shelf includes a supply line to supply the fire extinguishing agent from an external source, and, for each of the one or more BBUs, a spray nozzle and a valve that is coupled between the supply line and the spray nozzle,
wherein releasing the fire extinguishing agent comprises, for each of the BBUs that has a temperature exceeding the temperature threshold, opening a respective valve to cause a respective spray nozzle to spray the fire extinguishing agent onto the BBU.

15. The method of claim 14, further comprising obtaining, from a flow meter that is coupled to the supply line, a flow rate signal that represents a flow rate of the fire extinguishing agent flowing through the supply line.

16. The method of claim 15, further comprising:
determining an optimal flow rate at which the fire extinguishing agent is to flow based on a number of BBUs that have a temperature exceeding the temperature threshold and one or more predefined parameters; and
for each of the BBUs that has a temperature exceeding the temperature threshold, setting an opening ratio of the respective valve based on a difference between the flow rate and the optimal flow rate.

17. The method of claim 16, wherein the one or more predefined parameters comprise an internal volume of the BBU shelf and a predefined period of time for which the open valves are to remain open.

18. The method of claim 14, wherein each of the valves is a fail-open valve that opens in response to a power failure of the BBU shelf.

19. The method of claim 14, further comprising closing each of the open valves after a predefined period of time.

20. An electronic rack, comprising:
a plurality of pieces of Information Technology (IT) equipment, at least one of the pieces of IT equipment including one or more servers to provide data processing services;
a power supply unit coupled to the plurality of pieces of IT equipment; and
a battery backup unit (BBU) shelf to provide backup power to the pieces of IT equipment when the power supply unit is unavailable, wherein the BBU shelf includes a controller;
a supply line that to supply a fire extinguishing agent from an external source;
one or more BBUs, each BBU having a battery module with one or more battery cells, and a temperature sensor to sense a temperature of the BBU and to produce a temperature signal that represents the temperature;
for each of the one or more BBUs
a spray nozzle to spray the fire extinguishing agent onto the BBU; and
a valve that is coupled between the supply line and the spray nozzle,
wherein the controller is configured to 1) receive temperature signals from the temperature sensors and 2), for each BBU that has a temperature that exceeds a temperature threshold, open the valve of the BBU, thereby allowing the spray nozzle of the BBU to spray the fire extinguishing agent.

* * * * *